United States Patent [19]

Popov et al.

[11] 4,289,985

[45] Sep. 15, 1981

[54] ELECTRICAL MACHINE WITH CRYOGENIC COOLING

[76] Inventors: Jury S. Popov, ulitsa Bariernaya, 16, kv. 14, Novosibirsk; Jury V. Skachkov, Nevsky prospekt, 125, kv. 13, Leningrad; Iosif F. Filippov, ulitsa Pulkovskogo, 17, kv. 39, Leningrad; Gary M. Khutoretsky, ulitsa Altaiskaya, 20, kv. 5, Leningrad, all of U.S.S.R.

[21] Appl. No.: 972,397

[22] Filed: Dec. 22, 1978

[51] Int. Cl.³ .............................................. H02K 1/32
[52] U.S. Cl. ...................................... 310/61; 310/64
[58] Field of Search .................... 310/10, 40, 52, 61, 310/59, 64, 54, 91, 165, 219; 62/505

[56] References Cited

U.S. PATENT DOCUMENTS

| T914,004 | 9/1973 | Litz | 310/52 |
|---|---|---|---|
| 3,517,231 | 6/1970 | Massar | 310/52 |
| 3,626,717 | 12/1971 | Lorch | 62/505 |
| 3,648,082 | 3/1972 | MacNab | 310/10 |
| 3,729,640 | 4/1973 | Ross | 310/52 |
| 3,809,933 | 5/1974 | Sugawara | 310/40 |
| 3,881,875 | 6/1975 | Laskaris | 310/52 |
| 4,079,273 | 3/1978 | Lambrecht | 310/52 |
| 4,101,793 | 7/1978 | Berthet | 310/52 |
| 4,174,483 | 11/1979 | Vinokurov | 310/52 |

*Primary Examiner*—R. Skudy
*Attorney, Agent, or Firm*—Lackenbach, Lilling & Siegel

[57] ABSTRACT

An electrical machine with cryogenic cooling has a hollow rotor filled with a coolant and comprising a superconducting winding provided with at least two supply leads being cooled. One of the supply leads is connected to a plus sign current-collecting means and is disposed in at least one cooling duct for cooling one end part of the hollow shaft of the rotor. The cooling ducts for cooling both end parts of the hollow shaft of the rotor are connected, via respective exhausting means for withdrawing the coolant from the rotor, with respective coolant collecting chambers. The other supply lead is coupled to a minus sign current-collecting means. The hollow shaft of the rotor is provided with a passage for feeding the coolant to the superconducting winding, said passage being connected with an inlet means for introducing the coolant to the rotor, the inlet means being disposed in one end part of the hollow shaft of the rotor. There is a passage in the other end part of the shaft, which communicates with the rotor cavity and with a respective coolant collecting chamber via a respective exhausting means for withdrawing the coolant from the rotor. The supply lead connected to the minus sign current-collecting means is disposed in this passage and each of said current-collecting means is disposed in a respective coolant collecting chamber.

9 Claims, 9 Drawing Figures

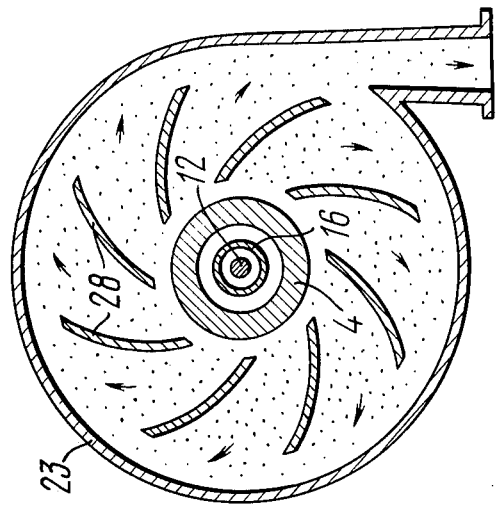
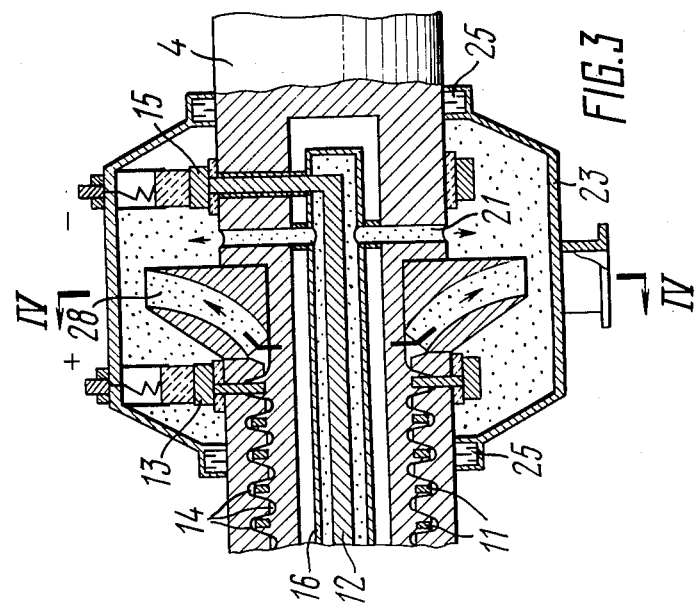

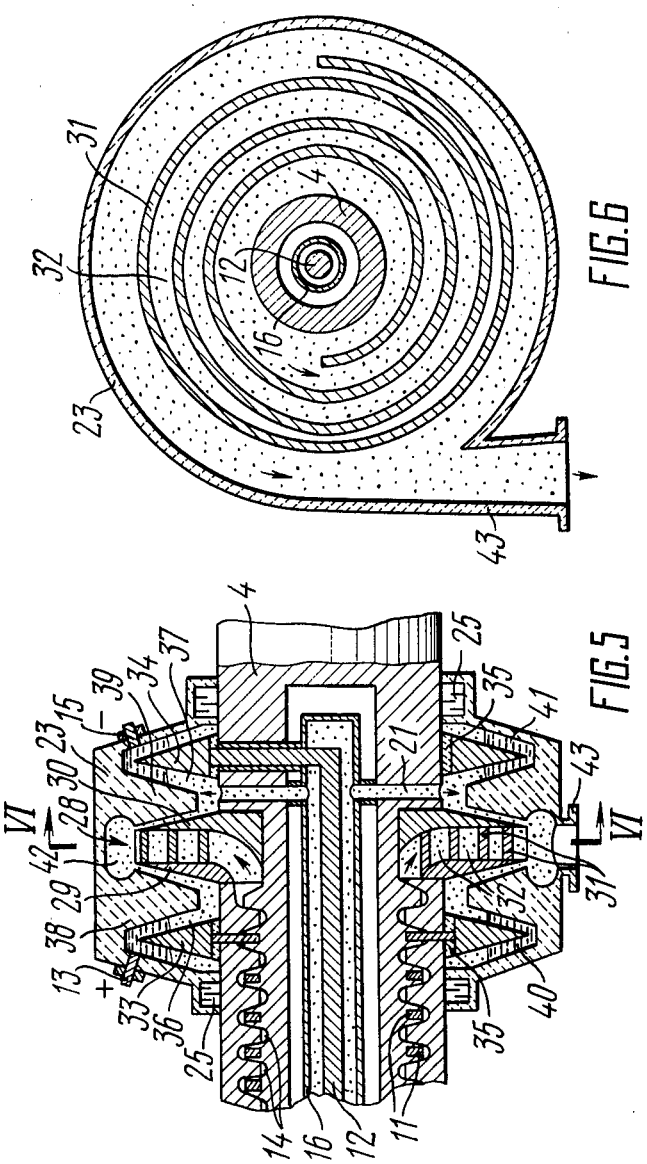

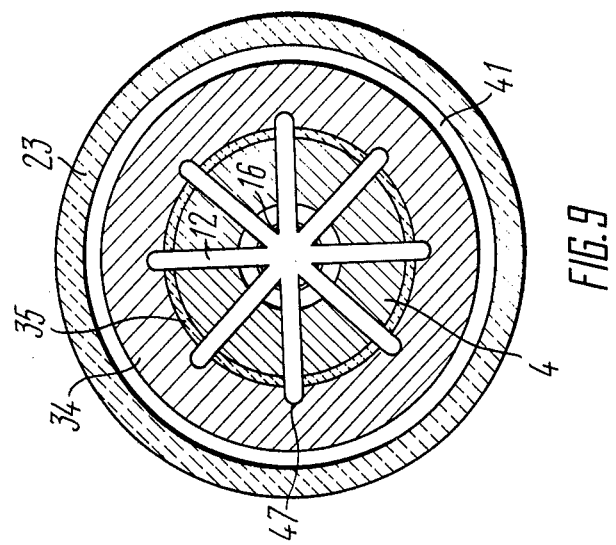
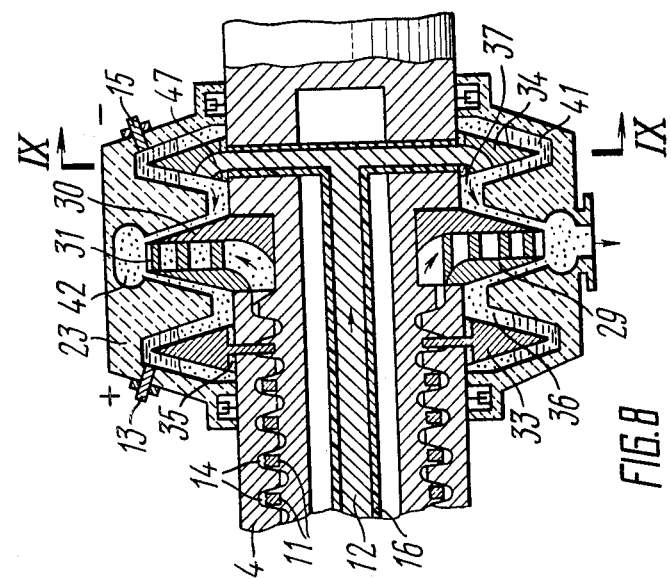

ELECTRICAL MACHINE WITH CRYOGENIC COOLING

FIELD OF THE INVENTION

The invention relates to electrical machines and, more particularly, to electrical machines with cryogenic cooling, including electric motors, generators and convertors suitable for use at atomic, thermal and other power stations as well as for transport and aircraft uses. The invention can also be applicable to space power stations and apparatus in which a rotatable object, for example, an electrical winding, is to be maintained at cryogenic temperatures.

BACKGROUND OF THE INVENTION

At present, the development of superconducting electrical machines whose electrical circuits have the values of their resistances approaching zero is important. There exist materials which feature the superconductivity phenomenon at a temperature close to the absolute zero temperature. Cryogenic liquid such as liquid helium is therefore used to reduce the temperature of an electric winding of a superconducting electrical machine to a temperature at which the winding becomes superconducting.

There are a number of superconducting electrical machines which utilize different cooling circuits for cooling superconducting windings. Most of the specialists working on the given problem consider the superconducting electrical machines based on a standard cooling circuit the most favorable. In such a machine the inductor is a rotatable component and the armature is an immovable one. The inductor armature is made of a superconducting material and is supplied with d.c. excitation, while the armature winding is non-superconducting or is made of a pure or superconductor material.

The above-described machines have rather serious disadvantages as follows. The liquid helium used to cool the superconducting winding is subject to compression due to cetrifugal forces with the result that its temperature and pressure are increased. An increase in the temperature of the liquid helium also results from the inflow of heat to it along the design components of the rotor shaft and the conductors connecting the superconductor winding to the current-collecting device and to the power supply both located outside the machine.

An increase in the temperature of the liquid helium always results in an increase in the temperature of the superconducting winding, which in turn results in a reduced efficiency of the machine; in some cases, the superconducting state and good operating condition of the machine are also disturbed.

To counteract the increased temperature of the liquid helium caused by centrifugal compression, the following methods are used: the superconducting winding is supplied with overcooled helium; a portion of a refrigerator and, particularly, its throttling stage is disposed in the rotatable rotor; and the pressure of the gaseous helium above the liquid helium is reduced or the thermal conductivity of one of the elements of the machine rotor is employed to transmit the heat produced in the liquid helium distributed over the periphery of the rotor to the liquid helium in the vicinity of the axis of rotation of the rotor. To restrict ingress of heat along the design elements of the rotor shaft and the connectors, the employed methods are as follows: a material of low thermal conductivity is disposed between the heat-absorbing and heat-emitting portions of the rotor; the latter location is cooled additionally using an intermediate coolant; use is made of the constructions in which the elements generating heat or conducting it to the "low" zone are cooled along the overall length with the help of the gaseous helium outgoing from the superconducting winding.

Known in the art is a superconducting electrical machine (cf. U.S. Pat. No. 3,729,640 (1973)) having a rotor with a superconducting winding supplied with d.c. excitation. There is a heat-transfer member within the rotor which is designed to transfer heat radially from the liquid helium distributed over the external wall of the rotor to the liquid helium passing through an axial feed passage to the superconducting winding. The heat-transfer member is a thick-wall disc located at the end face of the superconducting winding and brought into thermal contact with the liquid helium which surrounds the axial space of the rotor and is distributed over its periphery. However, this embodiment offers poor effectiveness since the area of the axial feed passage for the liquid helium is small. Moreover, the machine has a complex construction in this case for the following reasons: first, the heat-transfer member must provide for efficient removal of heat and must have an extended surface for this purpose; secondly, that member must be compact and robust to resist the action of centrifugal forces applied to it. It is known, however, that materials possessing good thermal conductivity such as copper and aluminum feature low mechanical strength and must be therefore reinforced by a material having higher mechanical strength and not affected appreciably by intense magnetic fields. Note that the time lag of the heat-transfer member does not allow it to resist an increase in the temperature of the superconducting winding during unstable operation of the machine occurring in the start mode and during transient conditions. Finally, there exist great inflows of heat along the shaft and conductors to the superconducting winding.

Known in the art is an electrical machine with cryogenic cooling (cf. the USSR Inventor's Certificates Nos. 476,638 and 262,240), which comprises a hollow rotor with a superconducting field winding connected to supply buses, a cooling system incorporating a feed passage for delivering a coolant (such as helium) to the superconducting field winding located along the axis of the rotor shaft, a means for cooling the end parts of the rotor shaft, and passages for withdrawing the coolant from the superconducting winding.

To cool the rotor shaft end parts, use is made of heat-insulating stoppers mounted within a cylindrical portion of the hollow rotor at the locations where that cylindrical portion connects with the rotor shaft. The mating surfaces of the heat-insulating stoppers and of the cylindrical portion are provided with ribs arranged helically.

To reduce the pressure of the gaseous helium and the resistance of the cooling ducts, the gaseous helium is ejected into a space between the stator and the rotor and is then passed to a refrigerator.

The heat conducted into the rotor cavity tends to evaporate the liquid helium and the vapor so produced passes into the spaces between the interior of the cylindrical portion of the rotor and the exterior of the heat-insulating stoppers. When passing through the spaces between the ribs to the passages for withdrawing the coolant, the heat-absorbing gaseous helium tends to absorb the heat conducted from the surrounding medium along the end faces of the rotor shaft.

In the known machine it is difficult to restrict the inflows of heat along the rotor shaft since a great amount of heat is transferred into the rotor cavity along the attachment points between the shaft end parts and the rotor cylindrical portion, which cannot be protected from outward ingress of heat; on the other hand, no protection from the inflows of heat along the conductors is provided.

The means for cooling the rotor shaft end parts, namely, the heat-insulating stoppers, results in sophisticated construction of the machine and increased dimensions thereof. With this construction, it is difficult, however, to restrict the inflow of heat along the shaft and conductors to the superconducting winding and, therefore, to the liquid helium. The flow rate of the coolant is also difficult to control at both end parts of the rotor shaft since the coolant, after passing through the cooling ducts in the stoppers, is ejected into a space between the rotor and stator and the machine has no coolant collecting chambers independent of the stator.

There is another electrical machine with cryogenic cooling (cf. the USSR Inventor's Certificate No. 484,606 dated May 5, 1973) which utilizes an additional coolant to reduce the inflow of heat along the shaft. Mounted on each end part of the rotor shaft, on the sides adjacent the end face walls of the cylindrical portion of the hollow rotor, is a chamber for the coolant. This chamber comprises coaxial discs (or cylinders) having a common wall, tubings for introducing the coolant being passed through the discs and rigidly mounted relative to the chamber, and mating discs attached to the stator and surrounding the firstmentioned discs. There are seals in a space between the movable and immovable discs.

The described embodiment requires a sophisticated construction of the machine which possesses a poor reliability in this case since reliable vacuum-tight rotatable seals operated at cryogenic temperatures are difficult to create. In addition, a considerable increase in the length of the rotor shaft is caused due to the fact that the chambers are installed on the shaft end parts. Moreover, no effective protection from the inflow of heat along the shaft is provided since the portions of the shaft end parts running from the chambers to the end face walls of the cylindrical portion of the rotor have no thermal protection at all and an increase in their size would affect the mechanical strength of the rotor. As a result, there results a considerable inflow of heat to the superconducting winding and the liquid helium along the shaft from the locations where the chambers are installed which are maintained at a temperature in the range from 20° to 80° K. to the superconducting winding. When another liquid coolant with a lower temperature is used, poor thermodynamic characteristics are obtained. In the described machine no protection from the inflow of heat to the superconducting winding along the conductors is provided.

Known in the art is an electrical machine with cryogenic cooling (cf. British Pat. No. 1,541,550) having a hollow rotor filled with a liquid helium. The rotor comprises a superconducting winding with at least two supply leads, one of the supply leads being connected to a plus sign current-collecting means and being disposed in at least one cooling duct for cooling one end part of the hollow shaft of the rotor. The cooling ducts for cooling both end parts of the hollow shaft of the rotor are connected, via respective exhausting means for withdrawing the coolant from the rotor, with respective coolant collecting chambers. The other supply lead is coupled to a minus sign current-collecting means. The hollow shaft being provided with a passage for feeding the coolant to the superconducting winding, said passage being connected with an inlet means for introducing the coolant into the rotor, said inlet means being disposed in one end part of the hollow shaft and being supported in bearings each having a housing with a seal.

In the known machine the end parts of the hollow shaft of the rotor are provided with multiturn helical ducts accomodating the supply leads, which tends to reduce the inflow of heat to the superconducting winding disposed within the hollow rotor. The supply leads used to connect the superconducting winding to the plus and minus sign current-collecting means are disposed in the ducts belonging to one end part of the hollow shaft of the rotor, which comprises the inlet means. The current-collecting means comprise rotatable rings of electric conductivity material and carbon brushes arranged in fixed relation to the rings and cooled due to heat exchange with the surrounding medium. The cooling ducts of the end parts of the hollow shaft of the rotor are connected, via the exhausting means implemented in the form of radial passages in the shaft body, with the coolant collecting chambers having their cylindrical casings surrounding the end parts of the hollow shaft, said casings having their end face walls provided with gas-tight seals. To provide for thermal insulation between the superconducting winding and the environment, the space between the rotor and stator is continuously maintained under a vacuum. For this purpose, the endshields of the stator casing mount, in addition to the bearings supporting the rotor, rotatable vacuum-tight seals.

Since the supply leads connected to the current-collecting means of plus and minus sign are disposed in common in the cooling ducts of one of the end parts of the hollow shaft of the rotor, these supply leads are difficult to insulate thermally and their cooling surface cannot be made extended; as a result, heat is removed from them with difficulty. The cooling of the current-collecting means by effecting heat exchange with the environment gives insufficient results and a great amount of heat generated therein is therefore transferred to the shaft and supply leads along which the heat is conducted directly to the superconducting wiring and the liquid helium available in the hollow rotor. In addition, a joint arrangement of the supply leads connected to the current-collecting means of plus and minus sign does not allow for an optimum operating condition of these leads since they conduct heat to the superconducting winding when the machine is started or when transient conditions take place. The exhausting means for withdrawing the coolant from the ducts in the end parts of the hollow shaft of the rotor, made in the form of radial passages in these end parts, possess a low effectiveness since the radial passages have a higher hydraulic resistance for the coolant at their inlets and outlets. It is also difficult to control the flow rate of the coolant through the cooling ducts of the end parts of the hollow shaft of the rotor, which is necessary during current surges caused by unstable operation of the machine, since there is no additional bypass passage for the coolant which would be independent of the cooling ducts for cooling the end parts of the hollow shaft of the rotor.

Due to the presence of a large number of rotatable seals at the end parts of the rotor shaft, the known machine features a complex construction and poor reliability. The gaseous coolant delivered to the coolant collecting chambers from the cooling ducts of the end parts of the hollow shaft of the rotor is contaminated in these chambers since there is foreign matter due to wear of the rotatable gas-tight seals and due to an evaporation of the liquid (oil) responsible for hermetic condition of these seals. As a result, one cannot attain an adequate cooling of the superconducting winding by reducing the pressure in the rotor cavity and by restricting the inflow of heat to this winding; moreover, the individual elements of the rotor and the machine as a whole cannot be given high reliability properties.

SUMMARY OF THE INVENTION

An object of the invention is to provide an electrical machine with cryogenic cooling, whose superconducting winding can be cooled on a highly effective basis in all operating modes desirable.

Another object of the invention is to reduce the value of the total inflow of heat along the end parts of the rotor shaft and along the supply leads as well.

Still another object of the invention is to provide for a higher reliability of the current-collecting means of the machine.

A yet another object of the invention is to provide an electrical machine with cryogenic cooling, offering a simple construction.

There is provided an electrical machine with cryogenic cooling having a hollow rotor filled with a coolant. The rotor comprises a superconducting winding with at least two supply leads, one of the supply leads being coupled to a plus sign current-collecting means and disposed in at least one cooling duct for cooling one end part of a hollow shaft of the rotor. The cooling ducts for cooling both end parts of the hollow shaft of the rotor are connected, via respective means for withdrawing the coolant from the rotor, with respective coolant collecting chambers. The other supply lead is coupled to a minus sign current collecting means. The hollow shaft of the rotor is provided with a passage for feeding the coolant to the superconducting winding, the passage connecting with an inlet means for introducing the coolant into the rotor, the inlet means being disposed in the other end part of the hollow shaft which is supported in bearings each having a housing with a seal. The hollow shaft of the rotor may have, according to the invention, an additional passage made in the first one of the end parts of the hollow shaft and connected with the rotor cavity, an additional exhausting means for withdrawing the coolant from the rotor being provided to which the additional passage is connected with a respective coolant collecting chamber, the other supply lead coupled to the minus sign current-collecting means being disposed in the additional passage, and the current-collecting means being disposed in a respective coolant collecting chamber.

Advantageously, an electrical machine should have two supply leads connected to two respective plus sign current-collecting means and disposed in two respective cooling ducts for cooling the both end parts of the hollow shaft of the rotor, a first one of the plus sign current-collecting means, connected to the supply lead which is disposed in the first end part of the hollow shaft of the rotor together with the supply lead coupled to the minus sign current-collecting means, being disposed, together with the latter, in a respective coolant collecting chamber.

Preferably, an electrical machine should have at least one exhausting means for withdrawing the coolant from the rotor arranged to provide for communication between a cooling duct for cooling a respective end part of the hollow shaft of the rotor and a respective coolant collecting chamber and implemented in the form of a centrifugal wheel, which is installed on the outlet end member of the cooling duct of a respective end part of the hollow shaft of the rotor and is disposed in a respective coolant collecting chamber in close proximity to the current-collecting means disposed in it.

Advantageously, an electrical machine should have a centrifugal wheel comprising two discs with a strip disposed therebetween to take a fixed helical arrangement so that the width of a passage formed by the strip increases as viewed from the periphery of the helix to its center in a direction coinciding with the direction of rotation of the rotor.

Preferably, an electrical machine should have each of the current collecting means include a respective disc rigidly mounted on the hollow shaft of the rotor and disposed in a space formed by a respective end face wall of a respective coolant collecting chamber and a respective partition wall made in the chamber, the spaces being filled with a liquid-metal alloy providing for electrical conduction and being connected with each other through the coolant.

Advantageously, an electrical machine should comprise at least one coolant collecting chambers made of an electrical/thermal insulation material and rigidly attached, by virtue of its end face wall facing a respective bearing, to the housing of the bearing in order to provide for centering the disc of the current-collecting means disposed in a respective coolant collecting chamber with respect to it, that chamber, which is disposed on the end part of the hollow shaft of the rotor in the vicinity of the inlet means for introducing the coolant into the rotor, having its end face wall facing the inlet means in additional rigidly attached relation to the inlet means.

Preferably, in an electrical machine the supply lead connected to the minus sign current-collecting means should be porous and made of a material composed of two components A and B, the component A possessing a normal conductivity and the component B possessing a superconductivity. These components A and B are distributed over the length of the supply lead in such a manner that the end of the supply lead connecting to the current-collecting means is made of a material composed of 100% the component A and the other end of the supply lead is made of a material composed of 100% component B, the contents of these components A and B gradually, diminishing as measured in opposite directions from respective ends of the supply lead, beginning at the maximum values of these contents at these ends.

DESCRIPTION OF THE DRAWINGS

The invention will now be described, by way of example, with reference to the accompanying drawings, in which:

FIG. 3 is a partial longitudinal sectional view showing an electrical machine with cryogenic cooling with an exhausting means for withdrawing the coolant from the rotor made in the form of a centrifugal wheel, according to the invention;

FIG. 4 is a cross sectional view taken along the line IV—IV of FIG. 3, according to the invention;

FIG. 5 is a partial longitudinal sectional view showing an electrical machine with cryogenic cooling in which the exhausting means is made in the form of discs with a strip disposed therebetween and a liquid-metal alloy in the current-collecting means is provided, according to the invention;

FIG. 6 is a cross sectional view taken along the line VI—VI of FIG. 5, according to the invention;

FIG. 8 is a partial longitudinal sectional view of an electrical machine with cryogenic cooling in which the supply lead connected to the minus sign current-collecting means is porous and the current-collecting means are provided with a liquid-metal alloy, according to the invention; and FIG. 9 is a cross sectional view taken along the line IX—IX of FIG. 8, according to the invention.

DETAILED DESCRIPTION OF THE INVENTION

Figure 1:
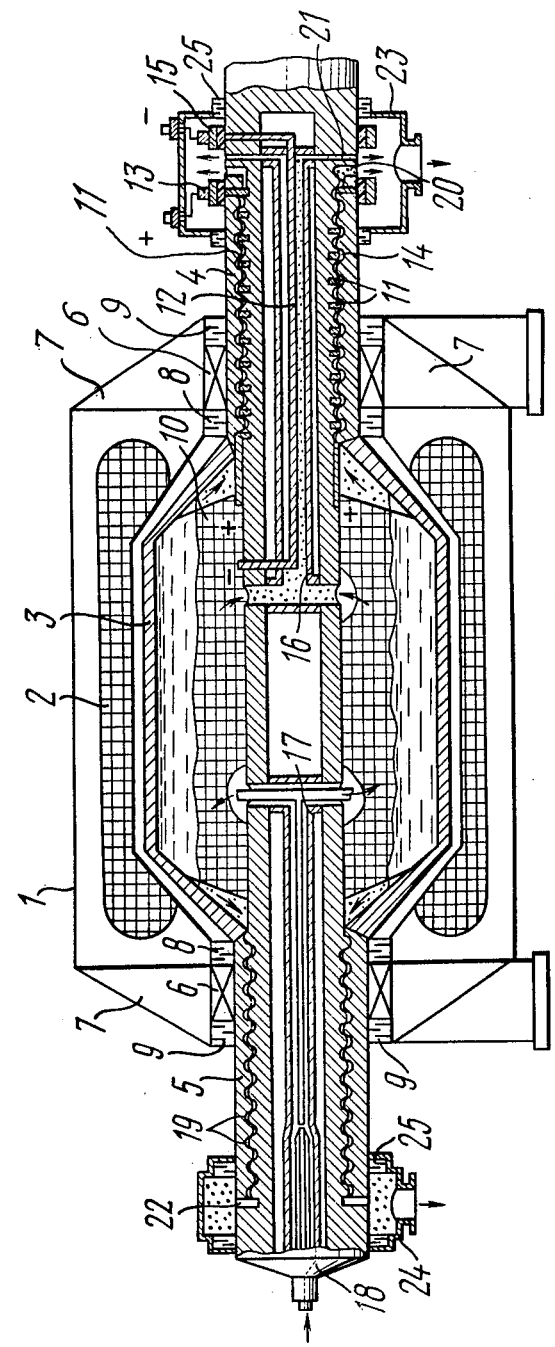
FIG. 1 is a partial longitudinal sectional view showing an electrical machine with cryogenic cooling, according to the invention.

The electrical machine with cryogenic cooling comprises, according to the invention, a casing 1 (FIG. 1) accommodating a stator winding 2 rigidly attached thereto (the stator winding 2 is shown diagrammatically in FIG. 1) and a hollow rotor 3 having end parts 4 and 5 of its hollow shaft supported in bearings 6. The bearings 6 are mounted in endshields 7 of the casing 1. The endshields 7 also mount vacuum-tight seals 8 and gas-tight seals 9 which are used to maintain a vacuum in the space between the stator winding 2 and the rotor 3.

A superconducting winding 10 (shown in FIG. 1 diagrammatically) is fixed within the cylindrical portion of the rotor 3 using, for example, an epoxy resin. The superconducting winding 10 has at least two supply leads 11 and 12, according to the described embodiment, which are cooled. The supply lead 11 is coupled electrically to the superconducting winding 10 and to a plus sign current-collecting means 13 and is disposed in at least one cooling duct for cooling one of the end parts of the hollow shaft of the rotor 3. In the described embodiment there is a group of cooling ducts 14 arranged along a helix on the end part 4 of the hollow shaft of the rotor 3. The supply lead 12 is coupled electrically to the superconducting winding 10 and to a minus sign current-collecting means 15 and is disposed in an axial passage 16 which is made in the form of a tubing disposed in the end part 4 of the hollow shaft of the rotor 3 and connected with the cavity of the rotor 3. The superconducting winding 10 is also connected hydraulically, for the purpose of cooling, with an axial passage 17 implemented in the other end part 5 of the hollow shaft of the rotor 3 as a tubing provided with thermal/vacuum insulation means and connected with an inlet means 18 for introducing the coolant into the rotor 3. To cool the end part 5 of the hollow shaft of the rotor 3, that end part is provided with cooling ducts 19 which are similar to the cooling ducts 14.

Exhausting means 20, 21 and 22 for withdrawing the coolant from the rotor 3 are provided at the outlets of the cooling ducts 14 and 19 as well as at the oulet of the axial passage 16, in the end parts 4 and 5 respectively of the hollow shaft of the rotor 3. These exhausting means 20, 21 and 22 provide communication between the cooling ducts 14 and 19 and the passage 16 and coolant collecting chambers 23 and 24 mounted respectively on the end parts 4 and 5 of the hollow shaft of the rotor 3. In the described embodiment, the exhausting means 20, 21 and 22 are radial passages made in the wall of the hollow shaft of the rotor 3. Mounted in the end face walls of the coolant collecting chambers 23 and 24 are rotatable gas-tight seals 25 which are analogous to the rotatable gas-tight seals 9 (the seals 9 and 25 are shown diagrammatically in FIG. 1).

In the desired embodiment the current-collecting means 13 and 15 are disposed in the coolant collecting chamber 23. Each of the current-collecting means comprises a metallic slip ring, rigidly attached to the end part 4 of the hollow shaft of the rotor 3, and a current-collecting brush.

To reduce the total inflow of heat to the superconducting winding 10 along the end parts 4 and 5 of the hollow shaft of the rotor 3 and along the supply leads 11 and 12, other embodiments dealing with their mutual arrangement are possible.

Figure 2:
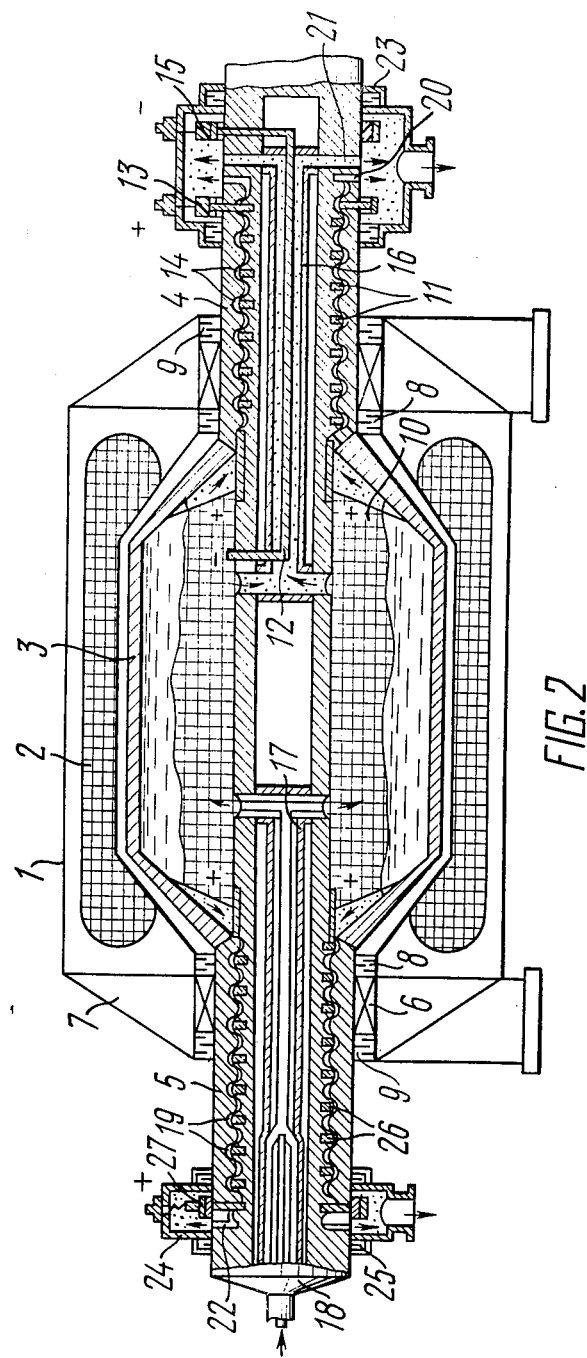
FIG. 2 is a partial longitudinal sectional view showing an electrical machine with cryogenic cooling in which the supply leads connected to the plus sign current-collecting means are available to both end parts of the hollow shaft, according to the invention.

There is an embodiment which includes, in addition to the supply lead 11 connected to the plus sign current-collecting means 13 another supply lead 26 (FIG. 2) disposed in the cooling ducts 19 for cooling the end part 5 of the hollow shaft of the rotor 3 and analogous to the supply lead 11. The supply lead 26 is electrically coupled to the superconducting winding 10 and to a plus sign current-collecting means 27 disposed within the coolant collecting chamber 24.

To reduce the pressure of the gaseous coolant in the rotor 3 and to increase the effectiveness of the exhausting means, which in turn results in greater effectiveness of the cooling ducts 14 and 19 and the passage 16, one of the exhausting means, namely, that labelled at 20, is made in the form of a centrifugal wheel 28 (FIGS. 3 and 4) which is rigidly attached to the end part 4 of the hollow shaft of the rotor 3 at the location where the outlet of the cooling ducts 14 (FIG. 3) is positioned. The inlet of the centrifugal wheel 28 is located at the same radius as the outlet of the cooling ducts 14. The passages of the centrifugal wheel 28 and those of the outlet branch of the coolant collecting chamber 23 as well as the latter proper are so implemented that the coolant is delivered from the cooling ducts 14 to the centrifugal wheel 28 in a shockless manner and does so when it leaves the centrifugal wheel 28 and is introduced into the inlet branch of the coolant collecting chamber 23.

In the described embodiment the centrifugal wheel 28 is located in the coolant collecting chamber 23 in close proximity to the plus sign (13) and minus sign (15) current-collecting means. The exhausting means 21, implemented in the form of radial passages providing a communication between the passage 16 accommodating the supply lead 12 and the coolant collecting chamber 23, is located between the centrifugal wheel 28 and the minus sign current-collecting means 15. As stated above, each of the current-collecting mens 13 and 15 is comprised of a rotatable metallic slip ring and a graphite brush immovably mounted with respect to the rotor 3.

To eliminate the effect of the increased pressure of the gaseous coolant on the exhausting properties of the cooling ducts 14 within the coolant collecting chamber 23, it is good practice to implement the centrifugal wheel 28, which provides for a communication between the cooling ducts 14 and the coolant collecting chamber 23, in the form of discs 29 (FIG. 5) and 30 with a strip 31 helically wound therebetween as a helix. The strip 31 is so arranged that the width of a passage 32 formed by it and by the end faces of the discs 29 and 30 increases as viewed from the periphery of the helix to its center and the direction, in which the width of the passages 32 (FIG. 6) increases, coincides with the direction of rotation of the rotor 3. In this embodiment it is good practice to have the plus sign (13) and the minus sign (15) current-collecting means in the form of discs 33 and 34 respectively which are made of a high electric conductivity material, for example, copper. The discs 33 and 34 are rigidly fixed, via thermal/electrical insulation gaskets 35 to the end part 4 of the hollow shaft of the rotor 3 at the outgoing points of the supply leads 11 and 12. The discs 33 and 34 are preferably disposed in individual spaces 36 and 37 respectively formed by the end face walls of the coolant collecting chamber 23 and internal annular wall partitions 38 and 39 and are coupled electrically via respective contacts 40 and 41 to the terminals of the current-collecting means 13 and 15. The contacts 40 and 41 are made of a galliumindium eutectic alloy providing for electrical conduction. The casing of the coolant collecting chamber 23 and the partition walls 38 and 39 are preferably made of a thermal/electrical insulation material which may be a conventional glass plastic or ceramic composition.

In the described embodiment the discs 29 and 30 are disposed in a central space 42 formed by the partition walls 38 and 39 and communicating with the spaces 36 and 37 through the agency of the coolant. The exhausting means 21 providing communication between the passage 16 and the coolant collecting chamber 23 is located between the discs 30 and 34. The space 42 communicates with a coolant discharge branch 43 which connects the space 42 with a refrigerator (not shown in the drawings). The branch 42 has a widening cross-section, is mounted on a tangent line to the space 42 and has its outlet directed to the side opposite to the direction of rotation of the rotor 3.

In order to provide for centering the discs 33 and 34 relative to the spaces 36 and 37 respectively and to reduce the number of gas-tight seals 25 (FIG. 7), the coolant collecting chambers 23 and 24 are rigidly connected to the housings of the bearings 6, mounted in the endshields 7 of the casing 1, while the coolant collecting chamber 24 is additionally fixed to the inlet means 18. In the described embodiment the plus sign current-collecting means 27 disposed in the chamber 24 is analogous to the plus sign current-collective means 13 located in the chamber 23. The current-collecting means 27 comprises a disc 44, installed in a space formed by a partition wall 45 and the end face wall of the chamber 24, and a liquid-metal contact 46 analogous to the contacts 40 and 41.

To provide for stable operation of the electrical machine of the invention during the start mode and under transient conditions, for better control of the flow rate of the gaseous coolant in the cooling ducts 14 and 19 and in the passage 16 and for greater effectiveness of these three elements, it is good practice to make the supply lead 12 (FIG. 8), connected to the minus sign current-collecting means 15, porous and composed of a material incorporating two components A and B, the component A possessing a normal conductivity property and the component B possessing a superconductivity property. The components A and B are distributed over the length of the supply lead 12 in such a manner that the end of the supply lead 12 connecting to the current-collecting means 15 is made of a material composed of 100% component A and the other end of the supply lead (12) connecting to the superconducting winding 10 (FIG. 1) is made of a material composed of 100% component B. It is necessary that the contents of the components A and B be gradually diminished as measured in opposite directions from respective ends of the supply lead 12, beginning from their maximum values at these ends. In this embodiment there exists a portion in the middle section of the supply lead 12, amounting in length to about 10 to 20 times the diameter of the lead 12, comprising identical amounts of the components A and B.

In the described embodiment the supply lead 12 is fabricated using a conventional method (for example, sintering or molding) and offers a porous structure through the overall length from the superconducting winding 10 to the disc 34 (FIG. 8) of the current-collecting means 15. Such a construction of the supply lead 12 makes it possible to combine it with a respective exhausting means. To this end, passages 47 are provided in the disc 34 while the supply lead 12 has a branched end whose branches are disposed in the passages 47. In the described embodiment there are eight passages 47 (FIG. 9) and eight branches of the branched end.

To provide for free and uniform passage of the coolant from the disc 34, which in turn provides for even distribution of heat over the disc, the outlets of the passages 47 (FIGS. 8 and 9) leaving the disc 34 of the current-collecting means 15 must be directed to the side of the space 42 of the coolant collecting chamber 23 and be located on a radius less than the radius of a free surface of the liquid-metal contact 41 (FIG. 9) generated during rotation of the rotor 3.

Arrows are used in FIGS. 1,2,3,4,5,6,7,8 and 9 to indicate the direction of movement of the coolant.

To maintain the superconducting winding 10 (FIG. 1) in a superconducting state, it is submerged into a bath with a liquid coolant such as liquid helium. Due to the action of centrifugal forces on the liquid helium passing from the axis of the rotor 3 to its periphery, a pressure gradient is developed in the helium with the result that the temperature of the helium, as well as the temperature of the superconducting winding 10 to which the helium is supplied, are increased. To maintain the temperature of the coolant and, therefore, that of the superconducting winding 10 within preset limits, it is common practice to reduce the pressure of the gaseous phase of the coolant above its liquid phase. In the embodiment of FIG. 1 this is done in the following manner.

The liquid helium is delivered under a small gauge pressure from a refrigerator (not shown in the drawing) via the inlet means 18 passes through the passage 17 into the cavity of the rotor 3 and into the passages (not shown in the drawing) of the superconducting winding 10. When passing from the axis of the rotor 3 to its periphery, the coolant tends to cool the superconducting winding 10 and is divided into liquid and gaseous phases. The liquid helium is accumulated on the inner wall of the cylindrical portion of the hollow rotor 3, while the gaseous helium tends to occupy the space in the vicinity of the axis of the rotor 3. In close proximity to the axis of the rotor 3 the gaseous helium is divided into three flows. Two of the flows are supplied to the cooling ducts 14 and 19 for cooling the end parts 4 and 5 of the hollow shaft of the rotor 3, whereas the third flow passes into the passage 16 accommodating the supply lead 12 and providing for communication between the superconducting winding 10 and the minus sign current-collecting means 15. Since the liquid helium provides for a higher heat transfer to the superconducting winding 10 as compared to the gaseous helium, the temperature of the superconducting winding 10 is determined by the temperature of the liquid helium distributed over the inner wall of the cylindrical portion of the hollow rotor 3. The superconducting winding 10 receives more cooling in the case of higher exhausting properties of the cooling ducts 14 and 19 and respective exhausting means 20 and 22 which provide for communication between the cooling ducts 14 and 19 and respective coolant collecting chambers 23 and 24.

The reduction of the temperature of the liquid helium and, therefore, that of the superconducting winding 10 will depend on the amount of heat conducted to the superconducting winding 10 and to the liquid helium from the end parts 4 and 5, from the supply leads 11 and 12 and from the current-collecting means 13 and 15. For this purpose, the gaseous helium supplied to the cooling ducts 14 passes to the end part 4 of the hollow shaft of the rotor 3 with the supply lead 11 and to the plus sign current-collecting means 13 to flow inwardly of them, whereas the gaseous helium supplied to the cooling ducts 19 conducts inwardly of the end part 5 of the hollow shaft of the rotor 3. To provide for intense removal of heat from the supply leads and current-collecting means, the supply leads connected to the minus and plus sign current-collecting means are made independent of each other, whereas the current-collecting means are located in the coolant collecting chambers which also accommodate the exhausting means for withdrawing the coolant from the rotor, exhausting means being used to connect the chambers with the cooling ducts. In the described embodiment the supply lead 12 connected to the minus sign current-collecting means 15 is disposed in the passage 16, while the exhausting means 21 as well as the minus sign current-collecting means 15 are located in the coolant collecting means 23. As a consequence, the gaseous helium applied to cool the supply lead 12, as well as the gaseous helium applied to cool the supply lead 11 disposed in the cooling ducts 14 of the end part 4 of the hollow shaft of the rotor 3, pass through the cooling ducts 14 and the passage 16 and enter, via respective exhausting means 20 and 21, the coolant collecting chamber 23. In the collant collecting chamber 23 the two flows of gaseous helium are joined together and used to cool concurrently the plus sign current-collecting means 13 and the minus sign current-collecting means 15. The gaseous helium leaving the coolant collecting chamber 23 is delivered to a refrigerator (not shown in the drawing) which also receives the flow of gaseous helium passing through the cooling ducts 19 and the exhausting means 22 to the coolant collecting chamber 24.

In the course of its movement the coolant tends to absorb some amount of heat produced by the above-described elements, thereby resulting in the transfer of heat from them. As a result, the inflow of heat to the superconducting winding 10 is restricted.

In the embodiment having two supply leads 11 and 26 (FIG. 2) respectively connected to the plus sign current-collecting means 13 and 27, the transfer of heat from the end parts 4 and 5 of the hollow shaft of the rotor 3, from the supply leads 11 and 12, and from respective current-collecting means 13 and 15 of plus and minus sign, as well as the cooling of the superconducting winding 10, are accomplished in a manner similar to that described above. The only difference is that the heat is also removed from the supply lead 26 disposed in the cooling ducts 19 and from the plus sign current-collecting means 27 so that the inflow of heat to the superconducting winding 10 is effected more adequately in the start mode and in the case of transient conditions where the current values exceed their rating by a factor of 3 to 5. The actuator for the supply lead 26 (not shown in the drawing) may be located both outside or inside the electrical machine. When the supply lead 26 is turned on or off, it is necessary to control the flow rate of the coolant passing through the cooling ducts 14 and 19 and passage 16 in order to attain their optimum operation in relation to the total inflow of heat conducted to the superconducting winding 10 along the end parts 4 and 5 of the hollow shaft of the rotor 3 and along the supply leads 11, 26 and 12 disposed respectively in the cooling ducts 14 and 19 and the passage 16. In principle, this kind of control can be effected with the help of controls (not shown in the drawing) which could be installed only at the outlets of the cooling ducts 14 and 19 and passage 16 in a "heat-transmitting" zone; if this is not so, the construction of the machine becomes much more complex and its reliability is reduced. The above-mentioned controls may be automatic throttling devices mounted at the outlets of the cooling ducts 14 and 19 and passage 16 respectively. However, the use of such devices in conjunction with the rotatable ducts makes the machine construction more complex and causes irrecoverable loss due to the throttling of the coolant passing through the devices. For this reason, at least one of the exhausting means which provides for communication between the cooling ducts 14 and the coolant collecting chamber 23 takes the form of the centrifugal wheel 28 (FIGS. 3 and 4). Controlling the pressure in the coolant collecting chamber 23 makes it possible to re-distribute the flow rate of the coolant relative the cooling ducts 14 and passage 16.

To provide for more effective control of the flow rate of the coolant in small electrical machines or machines with a low flow rate of the coolant, a preferable embodiment includes at least one of the exhausting means includes two discs 29 and 30 with a helical strip 31 disposed therebetween. In this embodiment an increase in the pressure of the gaseous helium in the coolant collecting chamber 23 tends to deteriorate the exhausting properties of the cooling ducts 14 and much less extend, whereas the flow rate related to the passage 16 can be increased or decreased depending on the operating mode of the machine.

To cool the current-collecting means 13 and 15 more effectively, they comprise the discs 33 and 34 with the liquid-metal contacts 40 and 41. Additional cooling for the means 13 and 15 is provided by the gaseous helium passing in the coolant collecting chamber 23. In operation, the discs 33 and 34 cause the contacts 40 and 41 to rotate with the result that the contacts are distributed evenly over the spaces 36 and 37 and better cooling is therefore attained. Liquid-metal contacts possess as a rule high chemical activity and their normal operation is thus achieved only under vacuum conditions or when an inert atmosphere is provided, for example, by argon or helium. The gaseous helium passing into the chamber 23 therefore prevents the contacts 40 and 41 from being oxidated. At the same time, the coolant itself is protected by the discs 33 and 34 and contacts 40 and 41 from foreign matter resulted from a wear of the gas-tight seals 25 of the coolant collecting chamber 23; the coolant is also prevented from being contaminated by foreign matter produced during a wear of the current-collecting means 13 and 15.

To reduce hydraulic loss at the outlet of the chamber 23, the chamber has a widening branch 43 (FIG. 6) which is affixed to the chamber 23 on a tangent line thereto and is directed to the side opposite to the direction of rotation of the rotor 3. The coolant leaves the passage 32 in which it is subject to twisting, enters the branch 43 without considerable hydraulic loss and then passes to the inlet of a refrigerator (not shown in the drawing).

Figure 7:
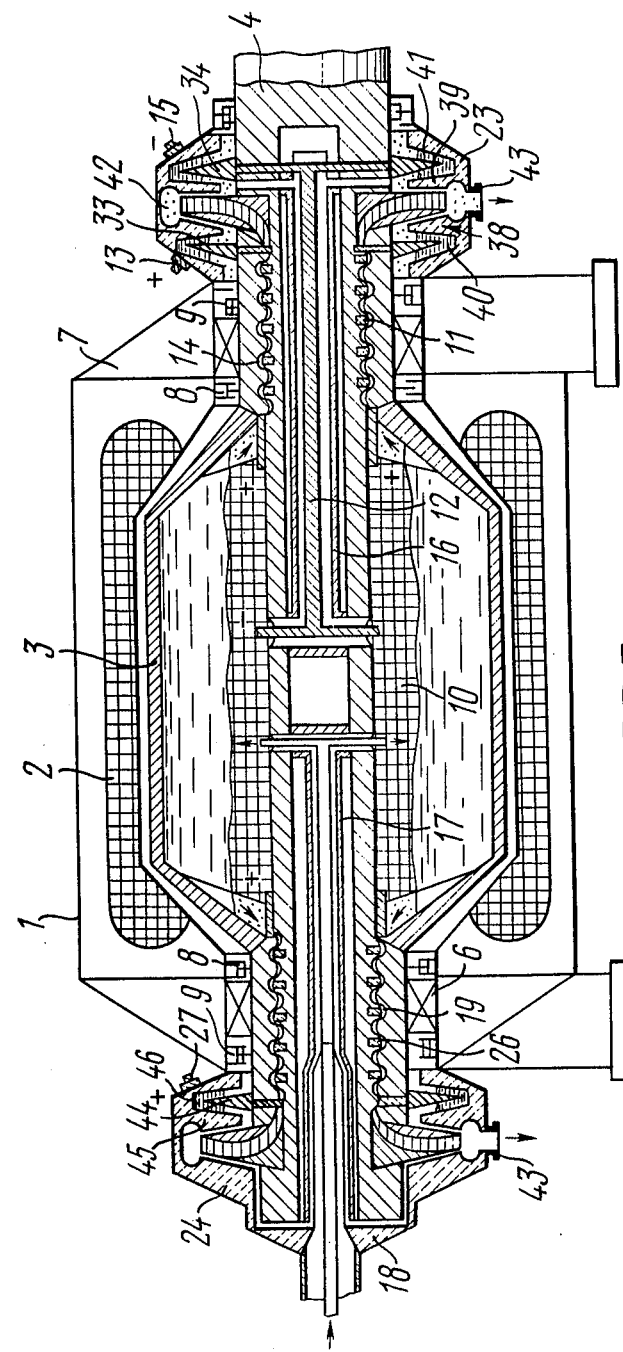
FIG. 7 is a partial longitudinal sectional view showing an electrical machine with cryogenic cooling in which the current-collecting means on both end parts of the hollow shaft are provided with a liquid-metall alloy and the casings of the coolant collecting chambers are rigidly connected with the bearing housings disposed in the endshields of the stator casing, according to the invention.

In the embodiments shown in FIGS. 7,8 and 9 the electrical machine of the invention operates in a manner similar to that described in the case of FIGS. 1,2,3,4,5 and 6. The only difference is that the coolant leaving the cooling ducts 19 (FIG. 7) for cooling the end part 5 of the hollow shaft of the rotor 3 provides additional protection of the liquid-metal contact 46; in addition, the coolant itself is prevented from being contaminated by foreign matter, namely, the particles resulting from a wear of the gas-tight seal 9 by the disc 44 of the plus sign current-collecting means 27 disposed in the coolant collecting chamber 24. After leaving the coolant collecting chamber, the coolant enters the refrigerator through the branch 43.

To provide for troubless operation of the electrical machine of the invention during the start mode and under transient conditions and to improve its reglation response, the flow rate of the coolant as related to the supply lead 12 and passages 47 (FIGS. 8 and 9) is preferably so selected that the component B of the supply lead 12 becomes superconducting at that point where the percent contents of the components A and B are equal to each other. In this case, the supply lead 12 operates adequately which means that the amount of heat conducted through it to the superconducting winding 10 is kept at a minimum and is not dependent upon abrupt changes of the current.

To provide for due thermal insulation between the stator winding 2 (FIG. 7) and the rotor 3, the space between them is evacuated and a vacuum condition therein is maintained by virtue of the gas-tight seals 9 of the hollow shaft of the rotor 3 and a continuously operated vacuum pumps (not shown in the drawing). A vacuum-tight insulation must be also provided between the end parts 4 and 5 of the hollow shaft of the rotor 3 and the passages 16 and 17 used respectively to introduce the coolant in and withdraw it form the cavity of the rotor 3.

The construction of the electrical machine of the invention makes it possible to withdraw the gaseous helium from the cavity of the rotor in a more effective manner. Since the removal of the gaseous helium results in a decrease in the pressure of the gaseous helium present above the liquid helium within the rotor, the pressure and temperature of the coolant itself and, therefore, the temperature of the superconducting winding are reduced. A decrease in the temperature of the superconducting winding results in its greater reliability and in an increase in the density of the current flowing through the superconductor; as a result, the efficiency of the whole machine is increased. As the machine runs at a greater number of revolutions, the helium is withdrawn at a higher rate and favorable temperature conditions for the superconducting winding are created; on the other hand, more efficient use of the "heat-absorbing" property of the helium vapor in cooling the end parts of the shaft, supply leads and current-collecting means causes a decreased overall consumption of the helium necessary for maintaining the superconducting state of the superconducting winding.

The arrangement of the supply leads connected to the current-collecting means of plus and minus sign in independent passages ensures simpler insulation methods for the leads and makes them more reliable since the shaft possesses higher heat capacity as compared to that of a supply lead; as a result, the supply leads connected to the plus sign current-collecting means are not affected considerably by heat surges occurred in the machine during the start mode and under transient conditions. On the other hand, the supply leads connected to the minus sign current-collecting means are made of a porous material composed of the components A and B possessing respectively normal conductivity and superconductivity properties. This allows for an extension of the zone in which these supply leads become superconducting: as a result, the current flowing through the supply leads and the amount of gaseous helium required for their adequate operation can be adjusted in a wide range.

The supply leads connected to the current-collecting means of plus and minus sign can be cooled in a better way due to the Peltier effect as follows. In a supply lead connected to a plus sign current-collecting means a certain amount of heat is absorbed at the soldered joint between a conventional conductor and a superconductor incorporated in the lead. On the other hand, in a supply lead connected to a minus sign current-collecting means the same amount of heat is evolved in an identical condition. Since the "minus sign" supply lead has a greater contact area for helium, the above-mentioned heat can be removed with ease. The joint arrangement of the exhausting means and the current-collecting means makes it possible to operate them in a better way. The outgoing gaseous helium provides for intense cooling of the rotatable liquid-metal contacts and prevents them from being oxidated. At the same time, the liquid-metal contacts tend to resist contamination of the outgoing gaseous helium with foreign matter produced due to wear of the rotatable gas-tight seals. The above-mentioned advantages provide for an increase of the reliability and efficiency of the machine of the invention and for a decrease of the operational cost.

What is claimed is:

1. An electrical machine with cryogenic cooling, comprising:
   a stator having a winding fixed in an internal cavity;
   a hollow rotor fixed in said stator and including a superconducting winding in an internal cavity, a hollow shaft of said rotor having first and second end parts, each end part having at least one cooling duct provided with inlet end and outlet end members, said first end part having an inlet means and a passage, said second end part having a passage with an inlet end member connected to said internal cavity of said rotor and an outlet end member, and each end part having coolant collecting chambers;

a coolant for cooling said rotor introduced into said cavity of said rotor via said inlet means and said passage of said first end part;

at least two supply leads having first ends rigidly attached to said superconducting winding, a first supply lead being disposed in said cooling ducts of said second end part and a second supply lead being disposed in said passage of said second end part;

at least two current-collecting means disposed in respective coolant collecting chambers and connected to second ends of respective supply leads; and exhausting means mounted in respective coolant collecting chambers and coupled to said outlet end members of said cooling ducts and of said passage of said second end part to withdraw said coolant from said internal cavity of said rotor.

2. An electrical machine as claimed in claim 1, wherein: at least one of said exhausting means includes a centrifugal wheel mounted on said outlet end member of a respective cooling duct and disposed in a respective coolant collecting chamber in close proximity to at least one of said current-collecting means.

3. An electrical machine as claimed in claim 1, wherein:
each of said current-collecting means includes a disc rigidly attached to said hollow shaft; and further comprising
partition walls in a respective coolant collecting chamber equal in number to said current-collecting means located in that chamber, said disc being disposed in a first space defined by a first end face wall of said coolant collecting chamber and said partition wall, and a second space defined by a second end face wall of said coolant collecting chamber and said partition wall and connected with said first space.

4. An electrical machine as claimed in claim 2, wherein: said centrifugal wheel includes two discs and a strip fixedly disposed between said discs and made as a helix, a passage defined by said strip having a width which increases as viewed from the periphery of the helix to its center in a direction coinciding with the direction of rotation of said rotor.

5. An electrical machine with cryogenic cooling according to claim 1, wherein a first current-collecting means of plus sign is connected to said first supply lead, and a current-collecting means of minus sign is connected to said second supply lead.

6. An electrical machine with cryogenic cooling according to claim 5, wherein a third supply lead is disposed in said cooling ducts of said first end part, and a second current-collecting means of plus sign is connected to said third supply lead.

7. An electrical machine with cryogenic cooling according to claim 1, further comprising bearings supporting said hollow shaft of said rotor, each of said bearings including a housing with vacuum and gas-type seals.

8. An electrical machine as claimed in claim 7, wherein:
each of said current-collecting means includes a disc rigidly attached to said hollow shaft; and further comprising
partition walls in a respective coolant collecting chamber equal in number to said current-collecting means located in that chamber, said disc being disposed in a first space defined by a first end face wall of said collant collecting chamber and said partition wall, and a second space defined by a second end face wall of said coolant collecting chamber and said partition wall and connected with said first space.

9. An electrical machine as claimed in claim 8, wherein:
at least one of said coolant collecting chambers is made of an electrical/thermal insulation material and is rigidly attached, by said end face wall facing a respective bearing, to said housing of said bearing to center said disc of said current-collecting means located in said coolant collecting chamber with respect to that chamber; and
said coolant collecting chamber on said first end part has said end face wall facing said inlet means in fixed relation to said inlet means.

* * * * *